(12) United States Patent
Nagaralu et al.

(10) Patent No.: US 9,639,696 B1
(45) Date of Patent: May 2, 2017

(54) METHOD AND APPARATUS FOR ANALYZING END USER LICENSE AGREEMENTS

(75) Inventors: Sree Hari Nagaralu, Pune (IN); Prabhat Kumar Singh, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1960 days.

(21) Appl. No.: 11/541,159

(22) Filed: Sep. 29, 2006

(51) Int. Cl.
  *G06F 21/00* (2013.01)
  *G06F 21/56* (2013.01)
  *G06F 21/55* (2013.01)
  *G06F 21/50* (2013.01)

(52) U.S. Cl.
  CPC ............ *G06F 21/56* (2013.01); *G06F 21/50* (2013.01); *G06F 21/55* (2013.01)

(58) Field of Classification Search
  CPC ........... G06F 21/56; G06F 21/50; G06F 21/55
  USPC .......................................................... 705/59
  See application file for complete search history.

(56) References Cited

U.S. PATENT DOCUMENTS

| | | | | |
|---|---|---|---|---|
| 6,779,187 | B1* | 8/2004 | Hammond | 719/331 |
| 7,765,592 | B2* | 7/2010 | Wang et al. | 726/22 |
| 7,840,958 | B1* | 11/2010 | Wan | 717/174 |
| 8,321,910 | B1* | 11/2012 | English | G06F 17/30144 726/2 |
| 8,528,087 | B2* | 9/2013 | Hsu et al. | 726/23 |
| 2002/0010686 | A1* | 1/2002 | Whitesage | 705/80 |
| 2002/0091579 | A1* | 7/2002 | Yehia et al. | 705/26 |
| 2004/0217987 | A1* | 11/2004 | Aran | 345/769 |
| 2005/0066324 | A1* | 3/2005 | Delgado et al. | 717/170 |
| 2005/0138427 | A1* | 6/2005 | Cromer et al. | 713/201 |
| 2005/0268112 | A1* | 12/2005 | Wang et al. | 713/188 |
| 2006/0031940 | A1* | 2/2006 | Rozman et al. | 726/27 |
| 2006/0253584 | A1* | 11/2006 | Dixon et al. | 709/225 |
| 2007/0083926 | A1* | 4/2007 | Burkhart et al. | 726/21 |
| 2008/0010153 | A1* | 1/2008 | Pugh-O'Connor | G06Q 20/10 705/14.15 |
| 2008/0104379 | A1* | 5/2008 | Peterman | G06F 9/44505 713/1 |

OTHER PUBLICATIONS

Nathaniel Good et al. "Stopping Spyware at the Gate: A User Study of Privacy, Notice and Spyware". Symposium on Usable Privacy and Security (SOUPS) 2005, Lorrie Faith Cranor (ed.), Symposium on Usable Privacy and Security (SOUPS), Jul. 2005.*
Privacy-Invasive Software and Preventive Mechanisms Boldt, M.; Carlsson, B. Systems and Networks Communications, 2006. ICSNC '06. International Conference on Oct. 2006 pp. 21-21.*
Javacool Software Website on EULAlyzer 1.1 dated Jan. 6, 2006; http://web.archive.org/web/20060106214926/javacoolsoftware.com/eulalyzer.html.*

(Continued)

*Primary Examiner* — Steven Kim
(74) *Attorney, Agent, or Firm* — Wilmer Cutler Pickering Hale and Dorr LLP

(57) ABSTRACT

A method and apparatus for analyzing end user license agreements and taking action based on the analysis outcome. In one embodiment, the method includes sensing initialization of an installable software program installation, extracting a EULA from the installable during installation, pausing presentation of the EULA to a user, providing a database of suspect terms, analyzing whether a suspect term exists in the EULA, and presenting at least one of the EULA or a suspect term to the user.

13 Claims, 5 Drawing Sheets

(56) References Cited

OTHER PUBLICATIONS

Javacool Software Website on EULAlzer Pro dated Jan. 6, 2006; http://web.archive.org/web/20060117072851/javacoolsoftware.com/eulalyzerpro.html.*
worldstart.com Tip #1999—EULA Analyzer Website dated Mar. 12, 2006; http://web.archive.org/web/20060312101210/http://www.worldstart.com/tips/tips.php/1999#.*
Screenshot of EULAlyzer 1.1. from worldstart.com Tip #1999—EULA Analyzer Website dated Mar. 12, 2006; http://web.archive.org/web/20060312101210/http://www.worldstart.com/tips/tips.php/1999#.*

* cited by examiner

METHOD AND APPARATUS FOR ANALYZING END USER LICENSE AGREEMENTS

BACKGROUND OF THE INVENTION

Field of the Invention

The present invention generally relates to computers and, more particularly, to techniques for protecting computers from undesirable software.

Description of the Background Art

The internet, local area networks, wide-area networks, wireless networks, and other distributed computer and database network systems are in wide-spread use throughout the world. These systems have many advantages as well as disadvantages and most users, when they have to, accept the disadvantages in order to benefit from the advantages. When the risk-benefit trade between advantages and disadvantages tilts to the disadvantageous, the market seeks to tilt the balance back toward the advantageous.

The computer user community has identified malware as one such disadvantage that users seek to eliminate from their computer environments. Unwanted or undesirable programs come in many types and are known by many names including viruses, spyware and adware. It is noted that the words spyware, adware, and malware are not precise terms in their usage and are used interchangeably throughout this disclosure. It is also noted that these terms relate to all undesirable software regardless how any given package operates on any given system.

Malware's general goal is to enter a user's computer and perform tasks that benefit the person or entity that created the malware or some other third party, not the computer's owner. Such benefits include collecting information about the user's internet habit by tracking the user's browsing habits and computer use and sending this information to the software provider's offices, sending unwanted pop-up advertisements, stealing passwords, or any number of other goals known in the art and inflicted on countless users daily. To the user however, these maiware characteristics mean a loss of personal privacy and risks to their computer data's integrity. It seems, in the market place, there are more and more malicious software programs infecting user's computers every day and this perception has lead to a demand for tools, such as virus scanners, that help users protect themselves from this malware.

Malware, alternatively known herein as unwanted software packages or u-ware, enters a user's computer using many routes. One well-known route is via the internet. A user, while browsing the internet, loads a given page from a given site. Another software package is loaded onto the user's computer and executed in the "background" unknown to the user and without their permission, during the page loading process. Once on the computer, the u-ware executes its instructions, typically in a manner that benefits a third party, not the user. To alleviate this problem, Anti Virus vendors have developed software packages that scan a computer's installed software to find u-ware components using signatures or behavioral blockers, well known techniques in the art. These scanning techniques involve scanning or running the executables themselves. Once the u-ware package is identified, the software quarantines or deletes the u-ware from the computer's memory and storage devices. This necessarily means that to find the u-ware with these techniques, the u-ware must first be installed on the computer.

When software is loaded onto a computer without the user's or installer's knowledge and agreement, removing the u-ware requires simply finding the code and deleting it using known techniques. There are circumstances when software with u-ware characteristics is installed on a computer with a user's permission. Removing this software then becomes a problem for Anti Virus software vendors because removing the u-ware may violate the license agreement the user accepted during the installation process.

In one illustrative example, the user acquires software that includes u-ware components hidden in the executable code. During installation, the user is presented with a End User's License Agreement or "EULA" and asked to accept the License terms before the program can be loaded onto their system. One commonly occurring problem is that users accept the EULA without completely reading or understanding the EULA text. Even though the EULA may contain information hinting at the presence of u-ware like behavior or terms permitting the program to load any other third party content, such indications are embedded deep in the typically very long and complicated EULA text. In other examples, the indication is so convoluted as to be difficult or impossible to understand by someone not familiar with these terms. Most users either do not attempt to completely study the EULA text or do not understand the fine print embedded in the text, but want the software, so they accept the terms. When the user later runs an anti-virus program, the program may find the u-ware components and remove them, possibly violating the EULA terms.

Anti Virus software vendors frequently receive objections and legal notices from software companies whose applications are cleaned as u-ware. The software companies point out that the user had agreed to the installation of the u-ware components during installation and point out the EULA terms that mention the u-ware or its behavior. All this may eventually lead to the users' systems being infected with spyware and adware programs because the u-ware cannot be removed, presenting a serious threat to the users' data privacy. Determining that u-ware characteristics may be present in an installable computer program before it is installed is a desirable goal, but doing so means that new techniques must be employed beyond signature recognition and behavioral blocking.

There is one software product in the industry, that attempts to solve the problem associated with deeply embedded EULA terms. The package is a trained classifier that, once installed on a computer and active, automatically detects and scans most license agreements when the license appears on the user's screen. The package scans the terms and phases that indicate the presence of u-ware like characteristics in the software package that the user is about to install. The package provides the scan results in a separate window so the user may review the suspect terms found during the scan. One significant concern with this software package is that it detects the EULA when it appears rather than intercepting the EULA prior to appearance. Many users accept EULA terms immediately upon the EULA window appearing because they just want the software loading to complete. Even with this product installed, the user might accept the EULA terms before the scan results are presented. There is a need and desire in the industry, therefore, to develop approaches to detecting u-ware terms embedded in EULAs, before the EULA is presented to the user for acceptance, and giving the user the option of stopping the installation before any u-ware can be added to their computer with their knowledge.

There may be other terms in a EULA that cause concern to Anti Virus software vendors, namely terms that restrict removal of individual components or third party components from an installed software package without removing the entire software package. In this example, an anti-virus scan is performed on a given computer system and the scan finds a component with u-ware characteristics, quarantining the u-ware component and deleting it from the computer even though the EULA had terms that restricted removing the single component. Anti Virus vendors frequently receive objections and legal notices from software companies about removing these single components because, in this case, the user agreed they would not remove single components.

There is a need, therefore, to automatically determine if restrictions on removing individual software components exists in an EULA before installation, and to take action when u-ware components are found, in such a manner that the accepted license agreements are not violated.

SUMMARY OF THE INVENTION

A method and apparatus for analyzing an end user's license agreement (EULA) and taking action based on the analysis outcome. In at least one specific embodiment, the method includes sensing initialization of an installable software program installation; extracting an EULA from the installable software during installation; pausing presentation of the EULA to a user; providing a database of suspect terms; determining whether a suspect term exists in the EULA; and presenting the EULA or suspect terms to the user for agreement.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
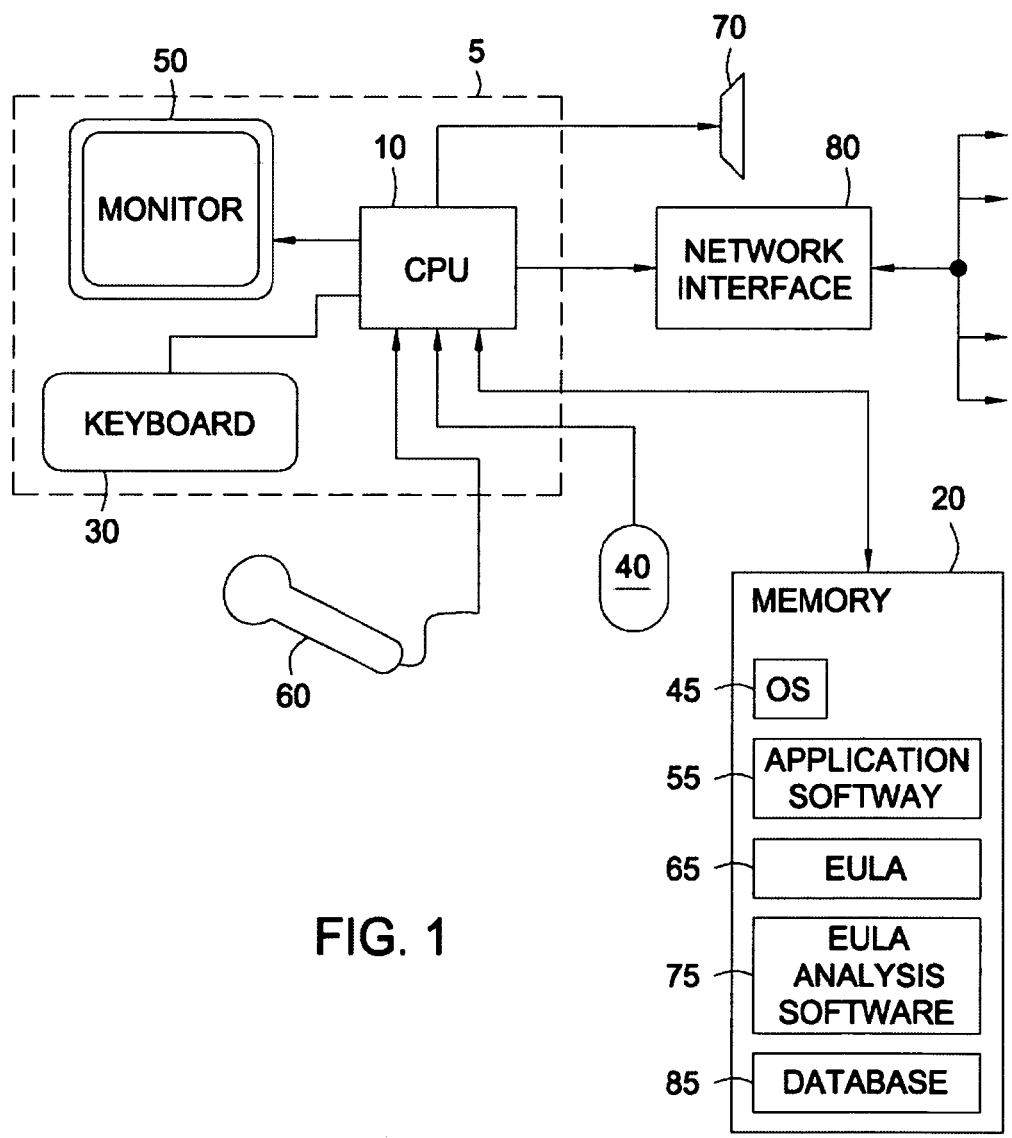
FIG. 1 depicts a representative computer system used to perform at least one embodiment of the invention.

FIG. 1 depicts a representative computer system for performing at least one embodiment of the present invention. Those skilled in the art will understand that there are many computer systems configurations and variations and it should be understood that the computer system 5 presented in FIG. 1 is not meant to limit the configurations within which the many embodiments of the invention, as described below, can be employed. The computer 5 comprises a central processing unit 10, a memory 20, a keyboard 30, a mouse 40, and a monitor 50, on which a software package according to one or more embodiments described herein can be executed. The computer 5 may also comprise a microphone 60 and a speaker 70 for universal access and voice recognition or commanding. The monitor 50 may be touch sensitive to operate as an input device as well as a display device. The computer system 5 may interface with external databases or the internet via the network interface 80. It should be understood that the term "network interface" does not indicate a limitation to interfaces that use only Ethernet connections and refers to all possible external interfaces, wired or wireless.

It should be noted that even though the computer system 5 is shown as a platform on which the methods described can be performed, the methods described can be performed on any platform where end user license agreements (EULAs) are accepted by users. For example, the many and varied embodiments described herein can be used on any device that has computing capability where software is loaded and a EULA is accepted. These devices can include but are not limited to and are presented for illustrative purposes only, distributed computer networks, hand held PCs, laptops, devices sold under the trademark names BLACKBERRY or PALM, cellular phones, hand held music players, or any other device or system upon which software is loaded and EULAs are accepted.

Referring again to FIG. 1, computer programs can be stored in the memory 20 and the central processing unit 10 works in concert with at least the memory 20, the input device 30 and the output device 50 to perform tasks for the user. In one or more embodiments, the memory 20 comprises any number and combination of memory devices, without limitation, as is currently available or can become available in the art. In one or more embodiments, memory devices include without limitation, and for illustrative purposes only: hard drives, disk drives, random access memory, read only memory, electronically erasable programmable read only memory, flash memory, thumb drive, and any other memory device. Those skilled in the art are familiar with the many variations that can be employed using memory devices and no limitations should be imposed on the embodiments herein due to memory device configurations and algorithm prosecution techniques.

The memory 20 stores an operating system (OS) 45, application software 55, EULA 65, EULA analysis software 75 and a database of suspect terms 85. The operating system facilitates control and execution of software using the CPU 10. Any of the available operating systems may be used in this manner including WINDOWS, LINUX, OSX, UNIX and the like. In accordance with one embodiment of the invention, the CPU 10 executes the EULA analysis software 75 to analyze the EULA 65 prior to installing the application software 55. Details of the analysis process is described below.

Figure 2:
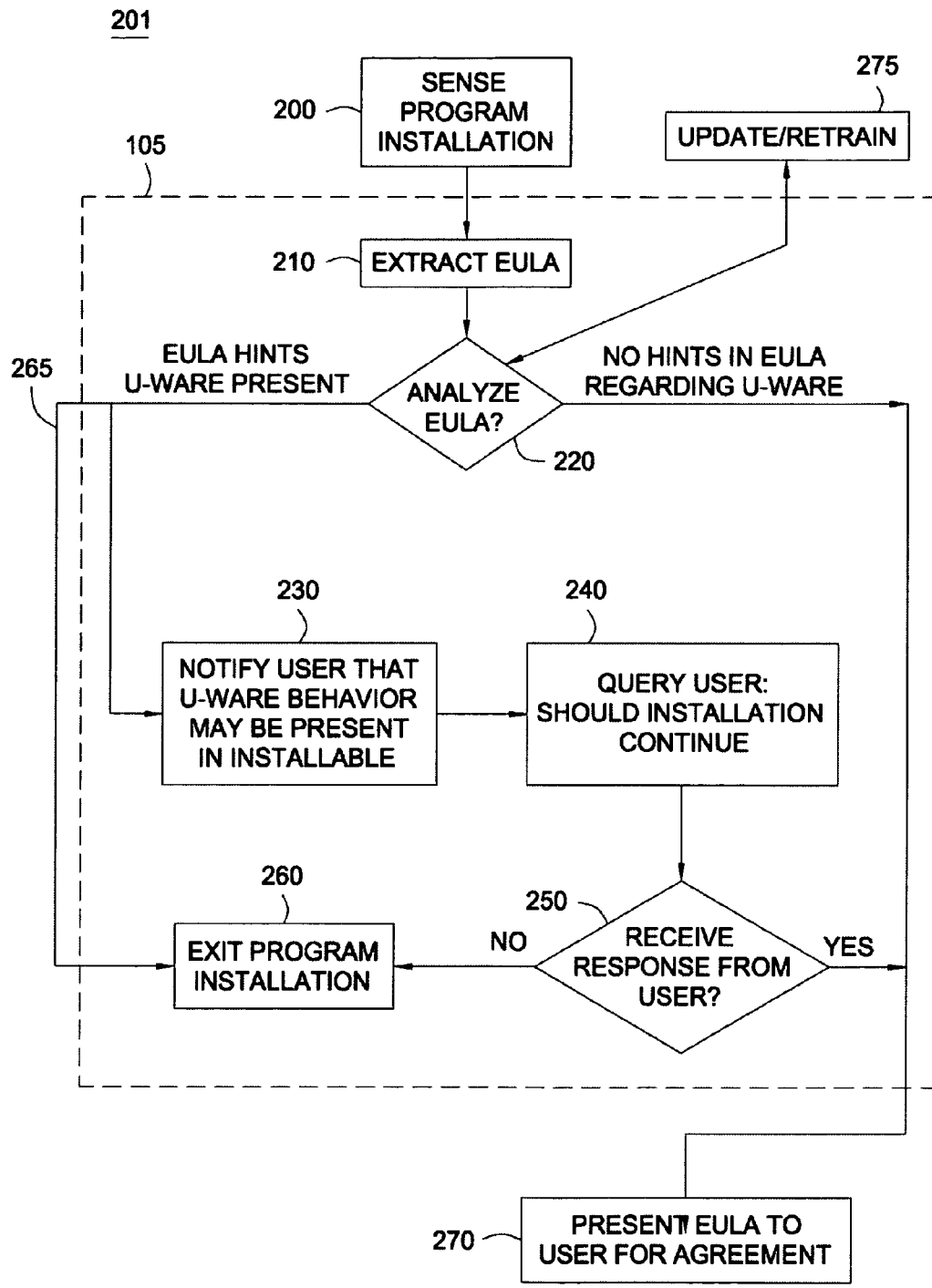
FIG. 2 depicts a flow diagram illustrating alternative embodiments for analyzing a EULA for u-ware and taking action based on the outcome of the analysis.

FIG. 2 depicts a flow diagram illustrating alternative embodiments of a method 201 for analyzing a EULA 65 for u-ware (e.g., application software 55 or a component thereof) and taking action based on the outcome of the analysis. In one or more embodiments of the invention, a program installation is sensed at step 200, after sensing, the EULA from that program installation package is extracted at step 210 and analyzed for its content at step 220. If the analysis determines the EULA terms at least hint at the presence of software with u-ware characteristics, the user is notified at step 230 and asked if they wish to continue installation at step 240. The user's response is received at step 250. If the user decides to discontinue the installation, the program is exited at step 260. If the user decides to continue the installation, the EULA is presented to the user for acceptance at step 270. Alternatively, if the analysis at step 220 does not find EULA language hinting at u-ware characteristics, the EULA is presented to the user for acceptance at step 270. If the analysis at step 220 determines the EULA terms at least hint at the presence of software with u-ware characteristics, the program proceeds along path 265 and is automatically exited at step 260. In one or more embodiments of the invention, the analysis step 220 utilizes updates or retraining at step 275 in view of decisions regarding EULA content.

In a more detailed description of the embodiments, when a software installation process is started, there are several techniques well known in the art for detecting or sensing the installation start up. For example, software sensors for computer resource monitoring, software sensors for sensing known installation engine startup, or any other technique well known in the art can be used. Upon sensing the installation, the installation process is paused (step not shown) using methods understood in the art, and the EULA is extracted, at step 210, from the installable software using any one of several well understood window interception techniques. After extracting the EULA at step 210, an analysis is performed at step 220 for suspect terms that at least hint at the presence of u-ware characteristics. Depending upon the set-up of the EULA analysis, the u-ware may be malicious in nature or have no malicious characteristics. As such, u-ware (unwanted software) is broadly defined with respect to the present invention as any software of a type that a user does not wish loaded on their computer.

In other embodiments, the installation process is allowed to continue until the EULA is loaded for presentation to the user but before it is displayed. Here, the EULA is intercepted, using various methods, and "hidden" from the user's view until at least the analysis is complete. In still further embodiments, the EULA is displayed in the "background" during analysis; and in various other embodiments, possibly during other steps described below; but the user is not given access to accepting the EULA until at least after the analysis is complete.

One of two paths are taken based on the analysis outcome after the analysis at step 220 is complete. It is important to note that the analysis step 220 can return a suspicious determination based on finding only a single suspect term or in the alternative finding any number and combination of suspect terms in accordance with a given embodiment's analysis technique rules and suspect terms. When the EULA has been analyzed as acceptable, the installation is allowed to continue and the EULA is presented to the user for agreement at step 270. In other embodiments, the EULA is "un-hidden" (step not shown), and the EULA is presented to the user for approval at step 270. Alternatively, the EULA is presented to the user for approval at step 270, and a message is sent to the user (step not shown), informing the user that a scan had been performed and no terms indicating u-ware were found in the EULA.

It should be noted that if the installable does not mention u-ware components or u-ware characteristics in its EULA, then these methods will not determine that the EULA is suspicious. These methods do not replace, but complement the existing signature-based or behavior based methods.

When the EULA indicates that u-ware characteristics are present in the installable software's components, the user is notified at 230 that u-ware behavior can be present in the installable software. The user is also queried at step 240 as to what action the user wishes to take, e.g. continue with the installation (step 270) or end the installation (step 260). It should be noted that steps 230 and 240 can be combined into a single step where the user is both notified of the results and queried regarding what action to take next. The EULA terms that were found by the analysis indicating that u-ware behavior was present (step 220) are presented to the user (step 270) with and along with the EULA paragraph or paragraphs from where they came. In other embodiments, the suspect EULA terms are highlighted and the entire EULA is presented to the user (step 270), the user being allowed to scroll the entire EULA text. At step 250, the user response is examined. If the user wishes to continue with the installation, despite the findings, the EULA is presented to the user for approval at step 270. If the user wishes to discontinue the installation, the installation is exited at step 260. In an alternative embodiment, after the analysis of step 220 determines the EULA is suspect, path 265 is taken where the installation is discontinued at step 260 without receiving feedback from the user.

In an embodiment where path 265 is executed, the installation exited (step 260), and a message displayed to the user (not shown) regarding the analysis findings, the displayed message may contain the EULA terms, the terms highlighted and presented in context with the EULA sentences or paragraphs from where they came, or the terms highlighted and the entire EULA presented for scrollable review.

It should be noted that not only terms pertaining to malware can be searched using the many and varied embodiments described herein. The database of suspect terms can include any suspect terms indicating any unwanted actions an installed software package may be programmed to execute. After the analysis is complete, the many decisional embodiments described can be used to exit or continue with the program's installation.

It is important to note that suspect terms, in some embodiments, include single words such as malware, adware, spyware, modification, advertising, ads, third-party, cookies, or other single words that indicate u-ware characteristics may be present in the installable software package. In other embodiments suspect terms include phrases such as third party, delivers advertising, display pop-up ads, without additional notice, without notifying you, send back, conduct research, search partners, access cookies, or out third party advertisers, third party partners, web beacons, ad campaign analysis, direct to sponsor's websites, periodically display sponsors' websites, redirect your web browser, or any other phrase or phrases that indicate u-ware characteristics may be present in the installable software package. In other embodiments, suspect terms include phrases or words along with relationship rules for how some words and phrases can be identified in context with other phrases and words. In yet other embodiments, suspect terms include characters, words, phrases, or words in context with other characters, phrases, and words. In yet other embodiments, suspect terms include any combination of characters, words, or phrases and any combination of relationship rules and contextual information that indicates u-ware characteristics may be present in the installable software package. The only limitation on the suspect terms, in some embodiments, is they should be terms that are consistent with the language the EULA is written. For example, if the EULA is written in Chinese, the suspect terms should be terms found in Chinese EULAs and so on. In various other embodiments, data mining is performed to generate suspect terms for one particular language, a base language. Upon sensing an installation at step 200, the EULA is extracted at step 210, and translated into the base language, step not shown, using language translation engines known in the art. After translation into the base language, the EULA is scanned for suspect terms at step 220 using the base language database.

Figure 3:
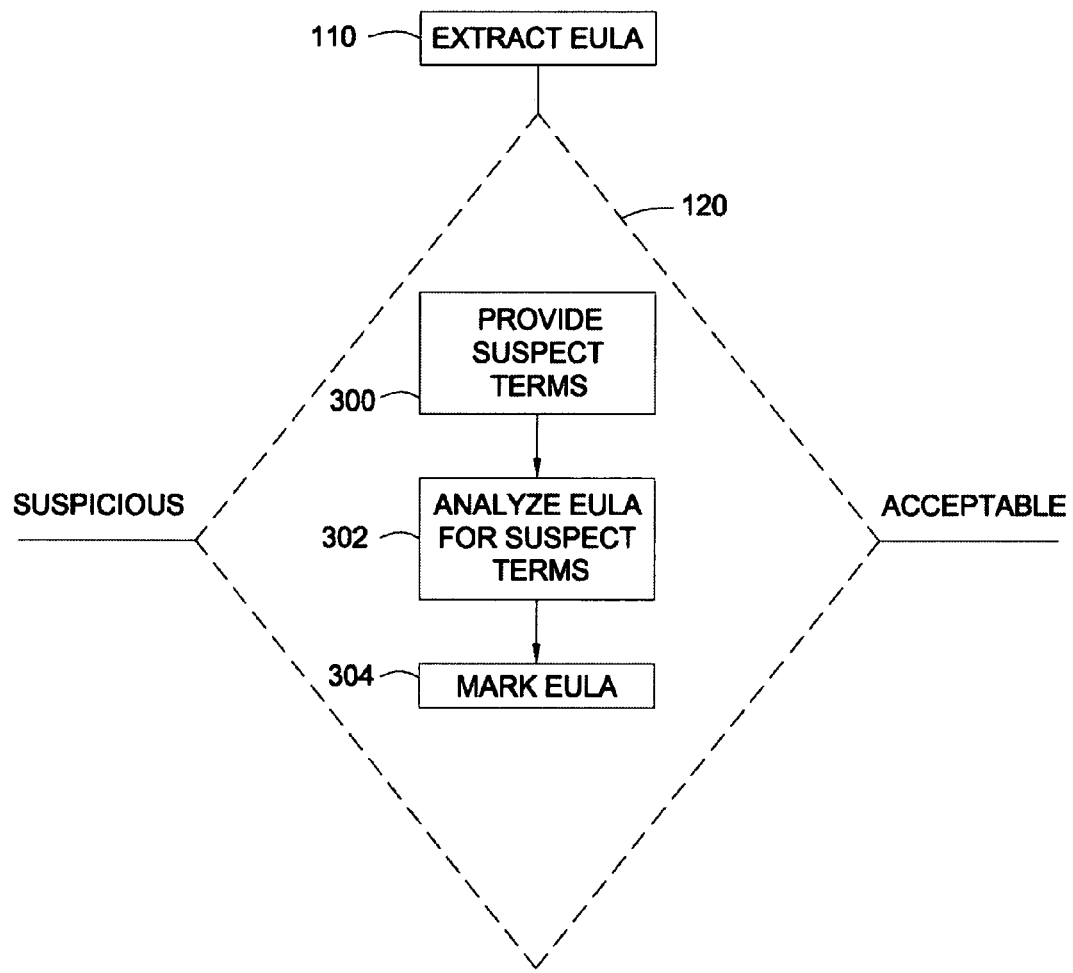
FIG. 3 depicts a flow diagram of one embodiment of the analyze EULA step in FIG. 2.

FIG. 3 depicts a flow diagram of one possible embodiment of the EULA analysis step 220 in FIG. 2. As shown in FIG. 3, a database of terms is provided at step 300, a search is performed at step 302 to determine if the suspect terms exist within the EULA, and based on the outcome, the EULA is marked at step 304 as suspicious or acceptable. In one or more embodiments, a database of suspect terms is developed by collecting "neutral" and "suspicious" EULA samples and storing these samples within a data set for use during the analysis or search step 302. Neutral EULA samples include EULA terms that are free from indications of u-ware characteristics in the installable and suspicious EULA samples include EULA terms that include indications that u-ware characteristics are present in the installable.

In one or more embodiments, a database of suspect terms is created for use at step 300 using data mining techniques known in the art. Suspicious EULA language for use at step 300 can be extracted through static and dynamic analysis of the installer programs for known software packages that contain u-ware. In other embodiments, suspicious language samples are manually entered by an operator. Suspicious language samples may be developed through an open-source process where third parties submit various suspicious term samples. In various other embodiments, a database of neutral or "clean" EULA terms and phrases is derived, in similar manners, from a large collection of sources in some embodiments and a large collection of application installers in various other embodiments or some combination of both sources. In some embodiments, the database of suspect terms is generated using the same techniques used by virus scanner vendors to build their databases, methods known in the art. The database of terms may be supplied by a third party provider that is different from the supplier of the EULA analysis software. Within all the various databases of suspect terms, at least a portion of the database within a suspect terms database is available for EULA analysis for indications of u-ware characteristics or third party component installations with u-ware characteristics.

Once the database of terms is accessed the EULA can be marked at step 304 as acceptable or suspicious. It should be noted that the words acceptable and suspicious indicate only a difference between two possible analysis outcomes and do not limit the many embodiments herein described. The determination can be made, by comparing the database of suspect terms with the EULA terms. The determination can also be made by comparing the database of suspect and neutral terms with the EULA terms. In one or more embodiments, marking the EULA can be performed by setting a variable within software code from one value to another value and calling subroutines based on that variable's value. Marking the EULA can be performed by changing a value in a table or by any means available for changing state data about the EULA stored within the computer memory for use by the process for determining what actions to perform after step 304 is complete.

In one or more embodiments, data mining is used to scan for suspect terms, contextual searches are performed and/or word or phrase search techniques are employed. In various other techniques, a trained classifier, that determines if certain terms exist within a text field, is used. One trained classifier embodiment includes the freeware software package distributed by Java Cool Software (Trademark) under the trademark name EULAlyzer. Another trained classifier, used in one or more embodiments, is a software package sold by Java Cool Software (Trademark) under the trademark name EULAlyzer Pro. In one or more embodiments, a Bayesian classifier can be employed. Here, the database of suspect terms can be used to train the various classifiers.

The database of suspect terms can be updated to account for changes in EULA language. In one or more embodiments, the trained analyzers can be "re-trained" to account for changes in EULA language. It is important to noteupdating the database includes adding or removing or adding and removing suspect terms. In other embodiments, updating the database includes manipulating terms as suggested above as well as changing analysis techniques. Depending on how the analyzer and terms database interact, analysis rules and suspect terms can be combined and held within a separate database as instructed by the analyzer, separate from the database altogether. In some embodiments the analyzer and database are combined and updating includes manipulating the executable code the analyzer uses to perform its tasks and updating the metadata associated with the suspect terms to improve analysis efficiency. Any combination of updating analysis algorithms and suspect terms is performed to improve both efficiency and accuracy.

Figure 4:
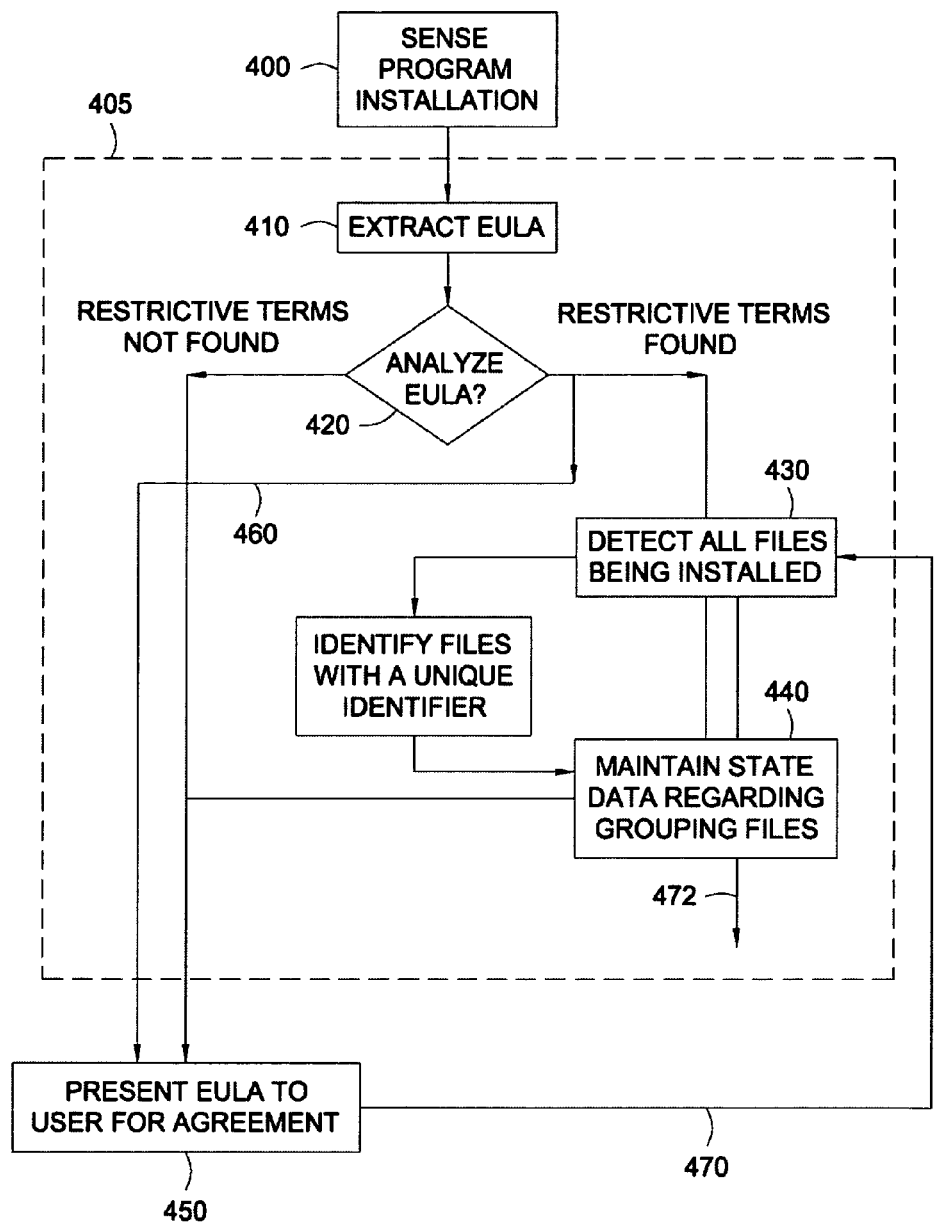
FIG. 4 depicts a flow diagram of one possible operating sequence for determining if restrictive terms exist within a EULA.

FIG. 4 depicts a flow diagram of one possible operating sequence (method 401) for determining if restrictive terms exist within a EULA. An analysis is performed to determine if there are restrictive terms limiting the removal of individual software components after installation. This analysis is performed to help protect anti-virus vendors from violating license terms by removing u-ware components when the user has agreed to be restricted from removing these components. In one or more embodiments, the program installation is sensed at step 400, the EULA is extracted at step 410, and the EULA is analyzed at step 420. At step 420, the method 401 scans the EULA text for terms indicating that there are restrictions to removing individual software components from the installable software after accepting the EULA (i.e., "suspect terms"). The analysis is performed using at least one of the many analysis techniques described above. A database of suspect terms, as described, can be used for detecting these restrictions. It should also be noted that, the various alternative embodiments for the development, supply and application of suspect terms for indicating restrictions to removing individual components or third party components are covered by those embodiments described above for suspect terms associated with finding u-ware in the installable software.

If the analysis fails to detect the presence of a restrictive term, the EULA is presented for user acceptance at step 450. If in the alternative, suspect terms indicating the restrictive clauses are present, all files being installed are detected at step 430. At step 440, state data or metadata is used to indicate that all files being installed are to be installed as a group. If removal of any one file is necessary, then these files need to all be removed together.

In other embodiments, as an alternative to maintaining state data, file level snapshots are created during installation at step 430 to identify the software grouping.

Figure 5:
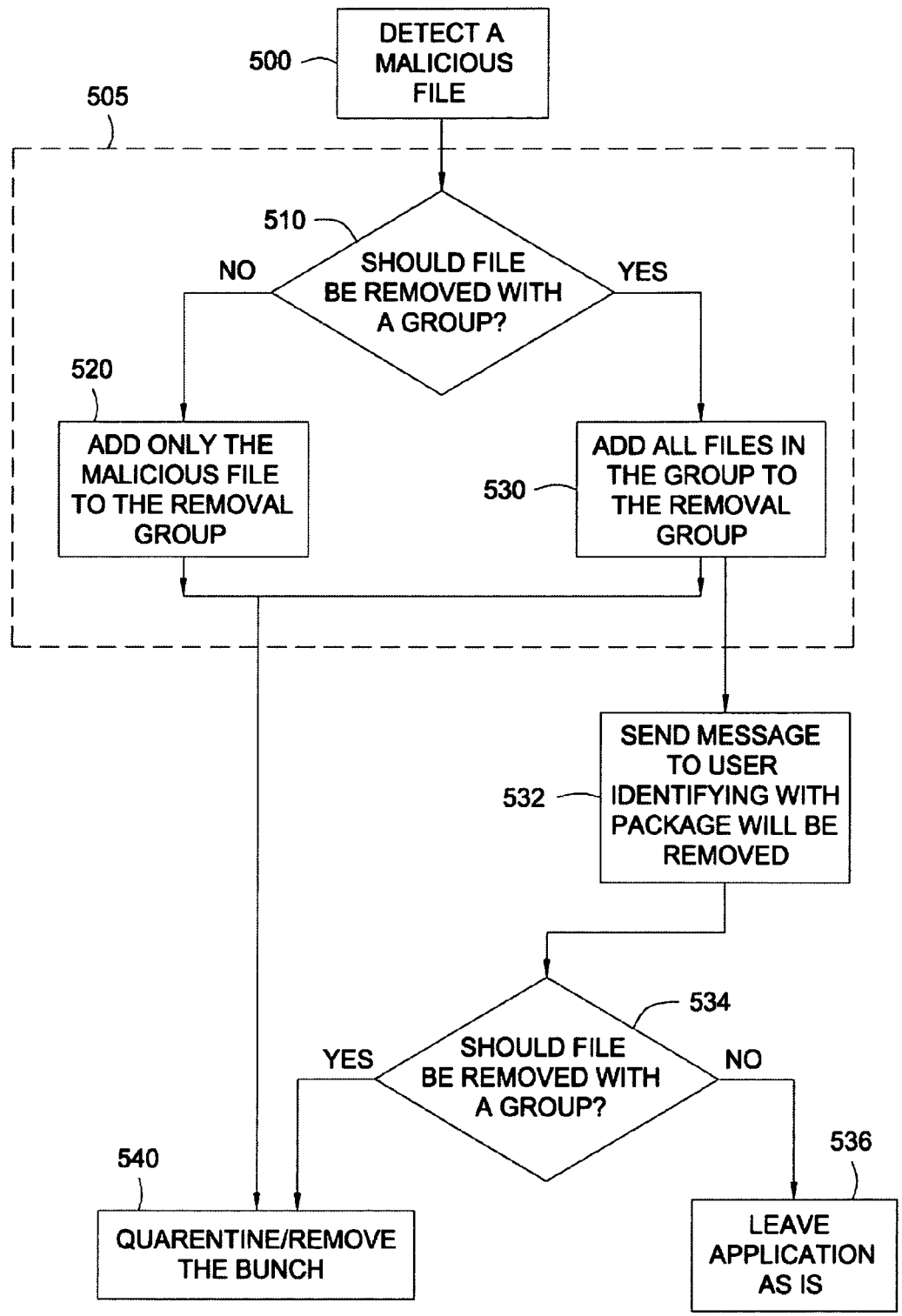
FIG. 5 depicts a flow diagram of one possible operating sequence for removing installed malicious files.

At step 450, the EULA is presented to the user for acceptance. In one or more alternative embodiments, a message is sent to the user, prior to or after EULA presentation, informing the user that such restrictive terms exist. The message may include a restatement of the suspect terms found during the analysis. The method 401 is exited along path 472. Subsequently, if the EULA is accepted, the software is installed or remains installed if it has already been installed. If the EULA is rejected, then the software is either blocked from installation or the installed software is removed. FIG. 5 discusses one embodiment of the invention for un-installing unwanted software.

In other embodiments, the EULA is presented to the user, see paths 460 and 470, prior to detecting the files being installed at step 430 and maintaining the state data at step 440. As such, the EULA may be accepted by a user and then steps 430 and 440 would not be executed. However, if the EULA is rejected, steps 430 and 440 are executed to determine the software that requires removal and/or non-installation. The method 401 is exited at step 472B.

FIG. 5 depicts a flow diagram of one possible operating sequence (method 501) for removing installed unwanted files. The removal of unwanted files or groups of files as described in the associated embodiments described herein allows anti-virus software to remove the files without violating the EULA terms of the installable software. After the EULA scan has been completed by the one or more embodiments described above, the method 501 is executed to perform a malware/virus/spyware removal phase. If a file is detected as unwanted, at step 500, instead of simply removing/quarantining the file, as is performed with the conventional methods in violation of the EULA, the functions 505 are performed to avoid EULA violation. The information store holding state data about restrictive EULA terms and the files associated with the restrictive terms is queried (step 510) to determine if all the files installed with the suspect file need to be removed along with the suspect file detected at step 500. If all the files need to be removed along with the unwanted file all files in the group are added to a removal group 430.

In an alternative embodiment, when restrictive terms are identified, the file level snapshots taken at installation, as described above, can gather the group and send it to the removal group step 530. If there are no restrictive terms regarding the unwanted component, the unwanted component is added to a removal group at step 520. After all unwanted components or groups identified during this phase are added to a removal group, the files in the group are removed/quarantined at step 540 in the conventional manner. In one or more alternative embodiments, during the detection step 430 in FIG. 4, all installed files are identified with a unique identifier, such as the filename of the installable software being installed, and the state data maintained regarding these files includes this unique identifier.

Before deleting a given group of files in FIG. 5, the user is sent a message at step 532 informing them that an entire group or software package, as identified by the unique identifier, must be removed to remove the identified u-ware component. The user is given a choice at step 534 to remove the entire application at step 540 or to leave the application as is at step 536, accepting that the application exhibits u-ware characteristics. In a further alternative embodiment (not shown), all installations are tracked such that all files are grouped regardless of the EULA terms. Here, if an unwanted file is found, the entire group is deleted/quarantined, giving complete protection to the Anti Virus vendor from EULA violation but this approach can not be very advantageous to the user.

While, for the purposes of disclosure there have been shown and described what are considered at present to be illustrative, example embodiments of the present invention; it will be appreciated by those skilled in the art that other uses can be resorted to and changes can be made to the example embodiment details or characteristics without departing from the spirit and scope of the invention. The fact that any illustrative list is present in this disclosure does not intend a limitation on the present invention to those items listed. It is therefore desired that the invention not be limited to these embodiments and it is intended that the appended claims cover all such modifications as fall within this spirit and scope.

While the foregoing is directed to embodiments of the present invention, other and further embodiments of the invention may be devised without departing from the basic scope thereof, and the scope thereof is determined by the claims that follow.

The invention claimed is:

1. A method for analyzing an end user's license agreement (EULA) and taking action based on the analysis outcome, comprising:

sensing, by at least one computer processor, initialization of an installation of an installable software program;

intercepting, by the at least one computer processor, the EULA from a program code of the installable software program during the installation, wherein the installable software program is configured to attempt to present the EULA to a user, wherein the interception occurs prior to the installable software program attempting to present the EULA to the user;

inhibiting, by the at least one computer processor, presentation of the EULA to the user;

providing, by the at least one computer processor, a database of suspect terms;

determining, by the at least one computer processor, that a suspect term within the database exists in the EULA;

presenting, by the at least one computer processor, the suspect term to the user;

installing, by the at least one computer processor, the installable software program;

detecting, by the at least one computer processor, a request for partial removal of the installed software program;

determining, by the at least one computer processor, that the partial removal of the installed software violates the EULA based on the suspect term; and complying with the suspect term in the EULA by automatically removing, by the at least one computer processor, a remainder of the installed software program based at least in part on the violation determination.

2. The method of by claim 1 wherein the determining is performed by a trained classifier.

3. The method of claim 2 wherein the trained classifier is trained using the suspect terms from the provided database.

4. The method of claim 1 further comprising highlighting and displaying the suspect term in context along with text of the EULA.

5. A method for analyzing an end user's license agreement (EULA) and taking action based on the analysis outcome, comprising:
   sensing, by at least one computer processor, initialization of an installation of an installable software program;
   intercepting, by the at least one computer processor, the EULA from a program code of the installable software program during the installation, wherein the installable software program is configured to attempt to present the EULA to a user, wherein the interception occurs prior to the installable software program attempting to present the EULA to the user;
   inhibiting, by the at least one computer processor, presentation of the EULA to the user;
   determining, by the at least one computer processor, whether a suspect term exists in the EULA, the suspect term indicating restrictions on removal of individual software components;
   presenting, by the at least one computer processor, the suspect term to the user;
   installing, by the at least one computer processor, the installable software program;
   detecting, by the at least one computer processor, a violation of the suspect term of the EULA based on a request for removal of a first individual software component; and
   correcting the violation of the suspect term of the EULA by removing, by the at least one computer processor, a remainder of the individual software components.

6. The method of claim 5 further comprising:
   detecting a malicious file; and
   adding the malicious file to a removal group.

7. The method of claim 5 further comprising:
   finding the suspect term in the EULA;
   detecting all files being installed; and
   maintaining state information indicating that the all files being installed are a group and if removed must be removed together.

8. The method of claim 7 further comprising:
   detecting a malicious file;
   adding the malicious file to a removal group;
   determining if the malicious file is part of the group; and
   adding the all files in the group to the removal group.

9. The method of claim 8 further comprising:
   naming the group using a unique identifier, wherein the unique identifier associates the group with a particular installable software program from which the all files were installed;
   maintaining the unique identifier with the state information;
   notifying the user that the all files in the group have been identified for removal, wherein the group is identified to the user by the unique identifier.

10. A method for analyzing an end-user license agreement (EULA), comprising:
   sensing, by at least one computer processor, an installation of a software package comprising a wanted software program and an unwanted software program;
   intercepting, by the at least one computer processor, the EULA from the software package;
   detecting, by the at least one computer processor, at least one restrictive term of the EULA indicating that a first removal of the unwanted software program requires a second removal of the wanted software program;
   detecting, by the at least one computer processor, an end-user agreement to the EULA;
   monitoring, by the at least one computer processor, the installation of the software package to generate state information including information about the at least one restrictive term of the EULA, a first plurality of files installed for the unwanted software program, and a second plurality of files installed for the wanted software program;
   detecting, by the at least one computer processor, a request for removal, by a u-ware removal software program, of at least one file of the first plurality of files installed for the unwanted software program;
   determining, by the at least one computer processor, that the removal of the at least one file of the first plurality of files installed for the unwanted software program violates the EULA based on the at least one restrictive term; and
   complying with the at least one restrictive term of the EULA by automatically removing, by the at least one computer processor, based on the state information and the violation determination, each remaining file of the first plurality of files installed for the unwanted software program and each remaining file of the second plurality of files installed for the wanted program.

11. The method of claim 10, wherein generating the state information further comprises generating at least one file-level snapshot during the installation of the software package.

12. The method of claim 10, wherein the state information further includes a unique identifier for identifying an association between the first plurality of files installed for the unwanted software program and the second plurality of files installed for the wanted software program.

13. The method of claim 10, wherein detecting an end-user agreement to the EULA further comprises:
   inhibiting a presentation of the EULA to a user;
   while inhibiting the presentation of the EULA to the user, presenting information about the at least one restrictive term of the EULA to the user;
   while inhibiting the presentation of the EULA to the user, receiving an acknowledgment of the information about the at least one restrictive term of the EULA from the user; and
   after receiving the acknowledgment, stopping the inhibiting of the presentation of the EULA to the user, wherein the EULA is presented to the user.

* * * * *